United States Patent
Frie et al.

(10) Patent No.: US 6,941,807 B2
(45) Date of Patent: Sep. 13, 2005

(54) DEVICE WITH AN AIR INTAKE MANIFOLD AND AN AIR MASS SENSOR ARRANGEMENT INSERTED THEREIN

(75) Inventors: Werner Rudolf Frie, Uttenreuth (DE); Stefan Pesahl, Saal A. D. Donau (DE); Stephen Setescak, Pentling (DE); Frank Steuber, Bad Abbach (DE)

(73) Assignee: Siemens Aktiegesellschaft, Munich (DE)

(*) Notice: Subject to any disclaimer, the term of this patent is extended or adjusted under 35 U.S.C. 154(b) by 0 days.

(21) Appl. No.: 10/494,638

(22) PCT Filed: Nov. 4, 2002

(86) PCT No.: PCT/DE02/04085

§ 371 (c)(1),
(2), (4) Date: May 4, 2004

(87) PCT Pub. No.: WO03/040665

PCT Pub. Date: May 15, 2003

(65) Prior Publication Data

US 2005/0109101 A1     May 26, 2005

(30) Foreign Application Priority Data

Nov. 5, 2001    (DE) ................................ 101 54 253

(51) Int. Cl.⁷ .............................................. G01F 1/68
(52) U.S. Cl. .............................. 73/204.21; 73/204.22; 73/202.5
(58) Field of Search .......................... 73/202.5, 204.21, 73/204.22, 118.02

(56) References Cited

U.S. PATENT DOCUMENTS

| | | | | | |
|---|---|---|---|---|---|
| 4,449,401 A | * | 5/1984 | Kaiser et al. | ............... | 73/202.5 |
| 4,457,169 A | * | 7/1984 | Lauterbach et al. | ....... | 73/202.5 |
| 6,085,587 A | * | 7/2000 | Konzelmann | ................ | 73/202 |
| 6,332,356 B1 | * | 12/2001 | Hecht et al. | ............... | 73/202.5 |
| 6,705,159 B2 | * | 3/2004 | Lenzing | ..................... | 73/202.5 |
| 6,840,101 B2 | * | 1/2005 | Renninger et al. | ......... | 73/202.5 |

* cited by examiner

Primary Examiner—Harshad Patel
(74) Attorney, Agent, or Firm—Morrison & Foerster LLP

(57) ABSTRACT

The invention relates to a device with an air inlet manifold (1) and an air mass sensor arrangement (2) inserted radially therein, the insertion opening (3) of which is arranged perpendicular to the airflow direction (6) in the manifold (1). A wing-shaped shielding body (7) is arranged before the insertion opening (3) such as to cover the insertion opening (3) and guarantee a streamline airflow to the insertion opening (3) and the essentially straight surface thereof, transverse to the flow direction of the air flowing over said surface, is oriented perpendicular to the insertion direction of the air mass sensor arrangement (2).

10 Claims, 3 Drawing Sheets

DEVICE WITH AN AIR INTAKE MANIFOLD AND AN AIR MASS SENSOR ARRANGEMENT INSERTED THEREIN

CLAIM FOR PRIORITY

This application claims priority to International Application No. PCT/DE02/04085, which was published in the German language on May 15, 2003, which claims the benefit of priority to German Application No. 101 54 253.4, which was filed in the German language on Nov. 5, 2001.

TECHNICAL FIELD OF THE INVENTION

The present invention relates to a device having an intake manifold and an air mass sensor arrangement.

BACKGROUND OF THE INVENTION

In internal combustion engines, with increasing frequency, cases have become known in which relatively large quantities of water have passed into the air intake duct. Air mass sensors usually based on hot-film manometry are normally arranged in the intake manifold in the air intake duct. In these air mass sensors, considerable distortion of the measuring signal or even failure of the sensor occurs in the event of the sensor element coming into contact with water.

The actual air mass sensors are accommodated in an air flow passage of an air mass sensor arrangement. EP 0 908 704 A1 shows an example of an air mass sensor arrangement which is inserted in an intake manifold of an internal combustion engine and in which the air flow passage in the sensor arrangement runs essentially perpendicularly to the air flow direction in the intake manifold, a factor which may be regarded as a first step in avoiding contact of the sensor element with water; however, this step is not nearly adequate. The air inlet opening of the sensor arrangement is oriented perpendicularly to the air flow direction in the intake manifold and is designed to be of relatively large area in order to even out flow fluctuations, which would distort the sensor signal. However, water is increasingly caught by the large-area inlet opening, a factor which again modifies the effect of the curved direction of the flow passage.

A device with an air intake manifold and an air mass sensor arrangement inserted radially therein, in which device a shielding body is arranged upstream of the inlet opening of the air mass sensor arrangement, can be gathered from the product specification of an air mass sensor from Pierburg AG, which according to the history listed there is supposed to be resistant to water and particles. The shielding body, on the one hand, covers the inlet opening, so that no water particles can pass directly into the inlet opening, and, on the other hand, appears to be of streamlined design, so that the air flow nonetheless reaches the inlet opening. It is at the same time designed to be rectilinear in the flow direction transversely to the curved profile of its surface and is arranged in the intake manifold in such a way that the direction of this rectilinear profile is parallel to the insertion direction of the air mass sensor arrangement.

According to the description with regard to a diagram on page 4 of the product specification, a water flow of 2.5 ml/min is taken as a basis, which can easily be coped with by the device shown. However, water flows of over 200 ml/min often occur in practice, and the device shown would probably hardly be able to cope with these water flows, since a large number of water particle ricochets can pass into the inlet opening of the air mass sensor arrangement.

DE 10015918A1 discloses a device for determining at least one parameter of a medium flowing in a line, this device having an air pipe into which a mass sensor arrangement is inserted radially. In the flow direction upstream of the measuring arrangement, a deflecting grid is arranged in the intake manifold, this deflecting grid directing the flowing air onto a baffle mound which is integrally formed in the interior of the intake manifold and is arranged between the grid and the measuring arrangement.

DE19632198C1 discloses a device for measuring the mass of a flowing medium, this device having an air flow pipe and a measuring arrangement which is inserted radially into the air flow pipe. Arranged upstream of the measuring arrangement is a baffle body whose longitudinal extent runs in a direction parallel to the insertion direction of the measuring arrangement in the air pipe.

DE1001642A1 discloses a device for determining at least one parameter of a flowing medium, this device having an air flow pipe in which a measuring arrangement is inserted in the radial direction. Furthermore, this device has a deflecting body which is arranged upstream in the flow direction and whose longitudinal extent runs parallel to the insertion direction of the sensor arrangement in the intake manifold. The task of the baffle body is to produce flow separation at sharp-edged corners. Arranged between the disturbance body and the measuring arrangement is a guide body which is intended to feed partial air flows to the measuring arrangement in a defined manner.

SUMMARY OF THE INVENTION

The present invention discloses a device which is designed such that virtually all the water particles can be kept away from the inlet opening.

In one embodiment of the invention, the device is formed with an air intake manifold and an air mass sensor arrangement which is inserted radially therein and whose inlet opening is oriented perpendicularly to the air flow direction in the intake manifold, a wing-shaped shielding body being arranged upstream of the inlet opening in such a way that it covers the inlet opening on the one hand and ensures a non-separating air flow to the inlet opening on the other hand, and its essentially rectilinear surface running transversely to the flow direction of the air flowing over its surface is oriented perpendicularly to the insertion direction of the air mass sensor arrangement.

Due to this orientation of the fitting direction of the wing-shaped shielding body, it can be of relatively large design, in contrast to the known shielding body, and can thus keep more water particles away without forming a markedly larger flow resistance, since the additional area is located in the flow region of the air mass sensor arrangement lying behind it, which already produces a flow resistance.

Especially advantageous with this fitting direction, however, is the contribution of the positive pressure, due to the air mass sensor arrangement, at its inflow side, this positive pressure, in addition to the wing-shaped and thus streamlined configuration of the shielding body, helping to ensure that the flow to the inlet opening does not separate, so that a low signal noise level is achieved.

The designation "wing-shaped" refers to shapes which, as already stated, are streamlined and have leading edges which enable the flow to come into effective contact with the shielding body without separating under swirl formation. The leading edges are preferably rounded off or beveled in such a way that the air flow and the leading edge form an acute angle. The further profile of the shielding body may in principle be rectilinear, but it is advantageous if it has a slight curvature or arching.

Although the shielding body may be thicker in the region of the leading edge, like an aircraft wing, it is advantageous for production reasons if it has an essentially constant thickness, since it is produced in an advantageous manner as an injection molding. In an especially advantageous manner, it is formed in one piece with the intake manifold, a factor which allows very cost-effective production.

In an especially advantageous design of the device according to the invention, the margins of the shielding body which run in the flow direction are provided with walls which may be provided both on the top side and on the underside or also on both sides. They may run over the entire length of the shielding body or also only in sections. These side walls ensure that fewer marginal swirls are generated, so that it is possible to provide a narrower shielding body, which produces less pressure loss in the intake manifold on account of a lower flow resistance.

In addition, the side walls provide protection against water droplets passing by means of the flow separated at the margins of the shielding body or as ricochets into the inlet opening of the air mass sensor arrangement.

The flow separation edge of the shielding body, with regard to the flow direction of the air in the intake manifold, lies below the inlet opening of the air mass sensor arrangement, since this inlet opening should be shielded as completely as possible. In addition, in an especially advantageous design of the invention, it lies downstream of the inlet opening with regard to the flow direction in order to prevent water particles possibly snatched up at the separation edge from passing into the inlet opening.

The wing-shaped shielding body is provided with holders at its four corners, by means of which holders it is connected to the intake manifold—advantageously in one piece. In this case, it is especially advantageous for production reasons if the front holders and the rear holders are laterally offset from one another, so that the intake manifold with the shielding body can easily be demolded during the injection molding.

The holders of the shielding body which lie close to the air mass sensor arrangement are advantageously arranged obliquely to the flow direction, so that the air flow is brought together again downstream of the air mass sensor arrangement.

In an advantageous design of the invention, the front holders, at their trailing edge, run obliquely to the direction of the air flow, so that water droplets forming at the holder can run at this trailing edge with the flow away from the inlet opening and cannot be separated and possibly directed with the flow to the inlet opening.

In an advantageous embodiment of the invention, that side of the air mass sensor arrangement which is oriented toward the shielding body has a transversely running web or a transverse groove, so that the water striking this side of the sensor arrangement cannot run to the inlet opening.

BRIEF DESCRIPTION OF THE DRAWINGS

The invention is explained in more detail below with reference to exemplary embodiments and with the aid of the figures. In the drawings.

DETAILED DESCRIPTION OF THE INVENTION

Figure 1:
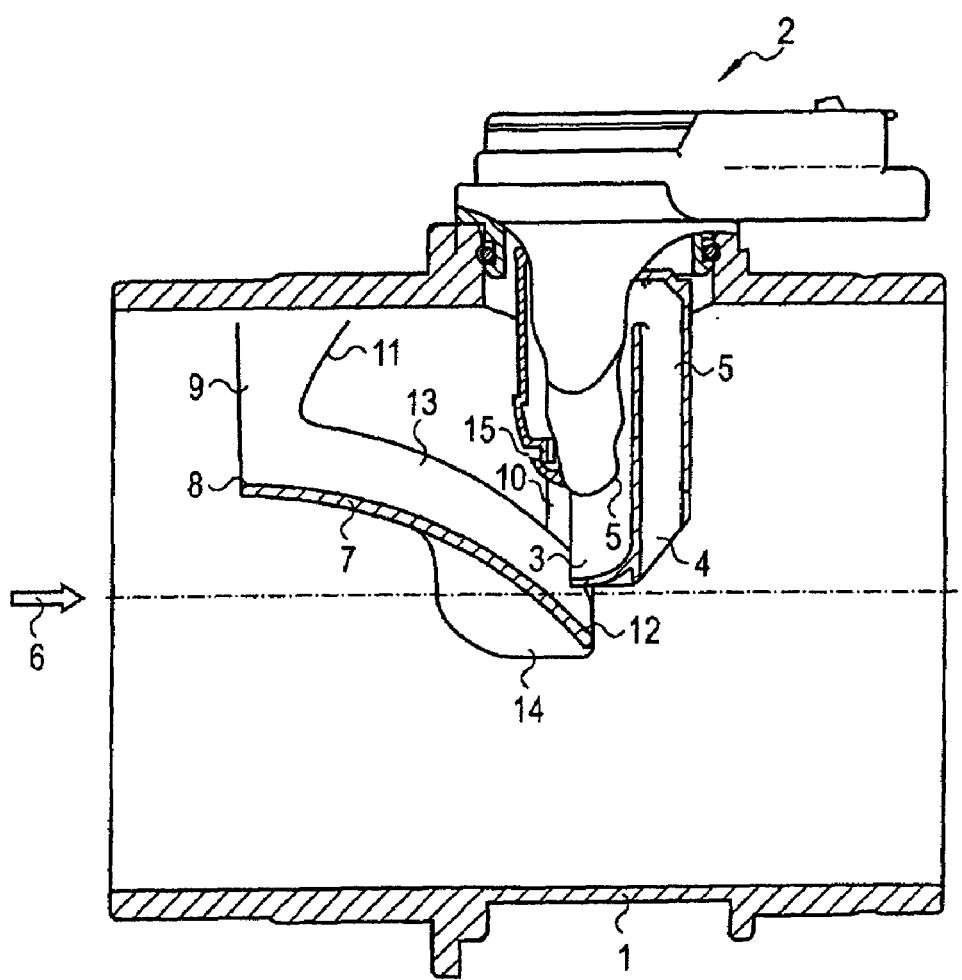
FIG. 1 shows a longitudinal cross section of a device according to the invention.
Figure 2:
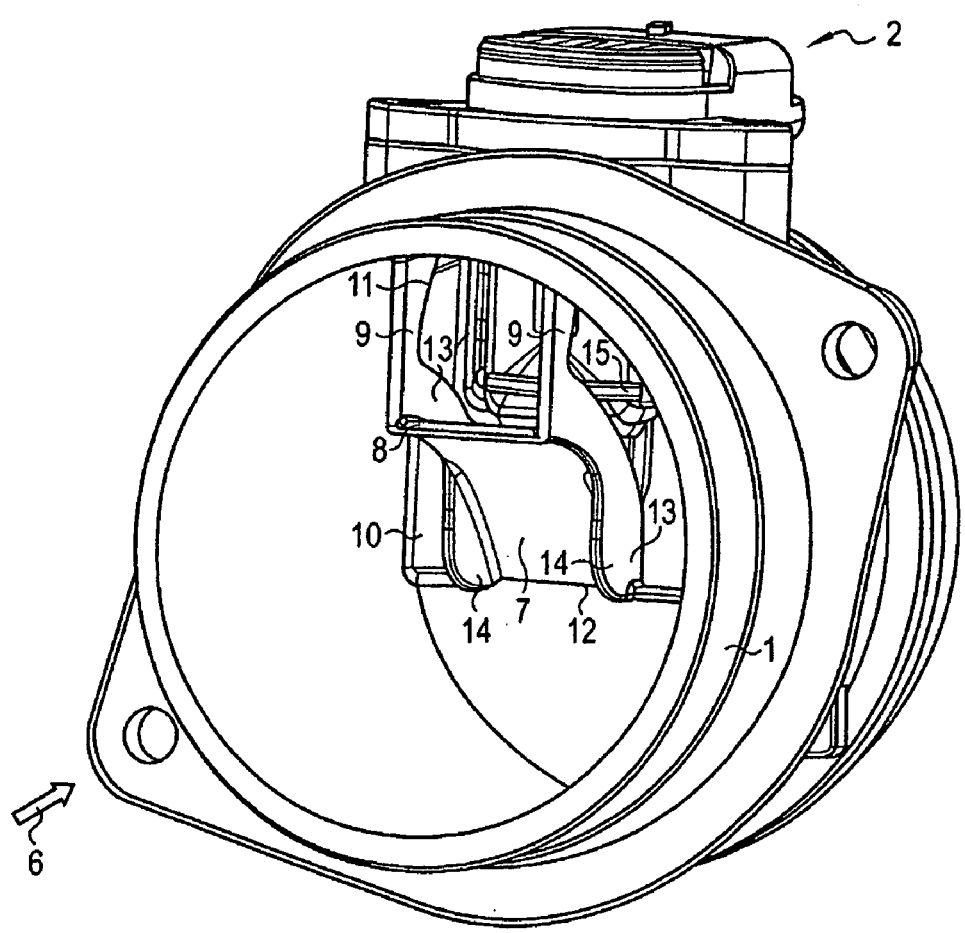
FIG. 2 shows a perspective representation of the device according to FIG. 1 as viewed in the flow direction.
Figure 3:
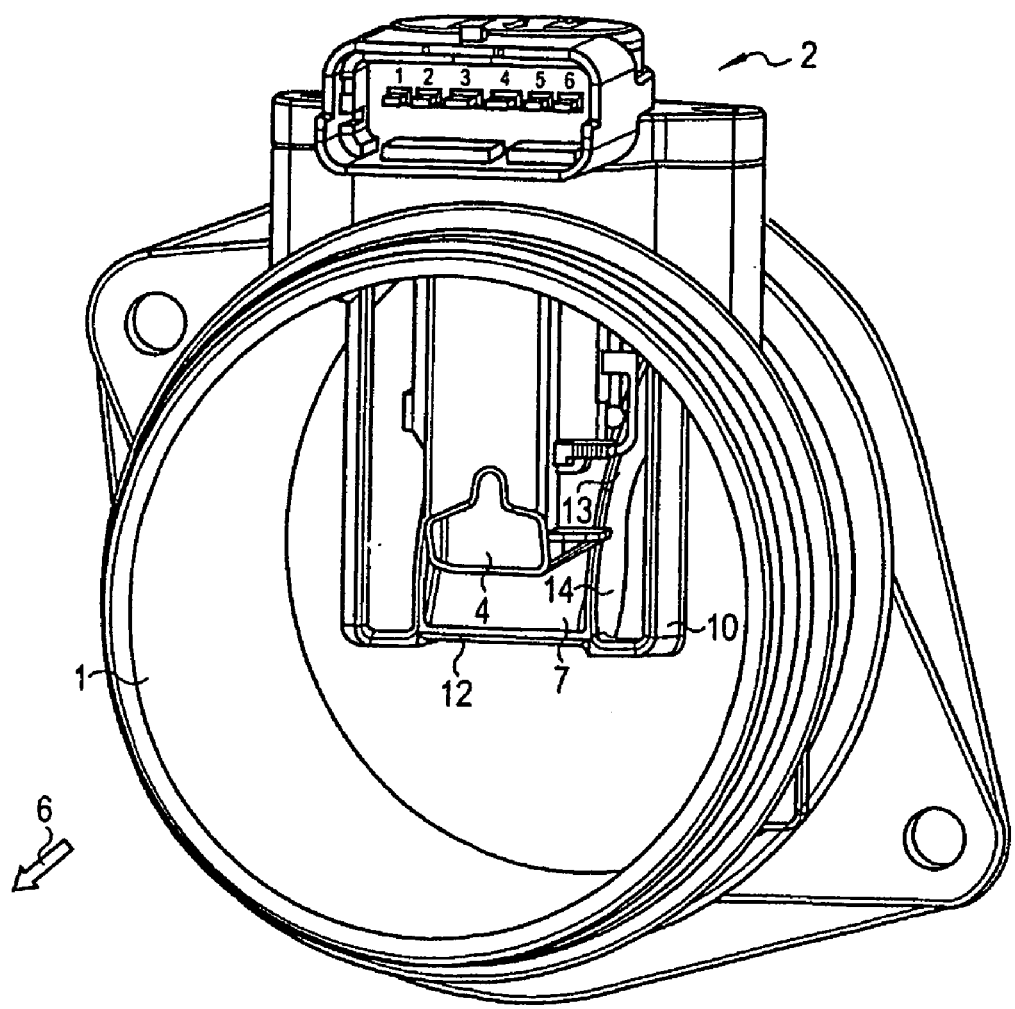
FIG. 3 shows a perspective representation of the device according to FIG. 1 as viewed against the flow direction.

The exemplary embodiment shown in the figures of a device according to the invention shows an inlet manifold 1, into which an air mass sensor arrangement 2 is inserted radially. In its essential parts, the air mass sensor arrangement 2 is constructed in a similar manner as disclosed by EP 0 908 704 A1 and need not be described in detail here. It has an inlet opening 3 and an outlet opening 4. The flow passage 5 between the inlet opening 3 and the outlet opening 4 has a curved configuration running essentially perpendicularly to the flow direction (indicated by an arrow 6) of the air in the intake manifold 1, as can be seen from FIG. 1, so that impingement of water particles on the actual sensor elements (not shown) is already reduced by this measure.

Relative to the flow direction of the air in the intake manifold 1, a shielding body 7 is arranged upstream of the inlet opening 3. It is dimensioned in such a way that its projection onto the inlet opening 3 completely covers the latter. Furthermore, in the flow direction of the air, it has a curved, wing-shaped profile of virtually constant thickness. Due to this configuration of the shielding body 7, water particles entrained with the intake air are prevented from passing into the inlet opening 3. However, the wing-shaped and thus streamlined configuration of the shielding body 3 ensures that the air flow is directed along the shielding body to the inlet opening without separation; the water particles continue to fly straight ahead on account of the larger mass.

The leading edge 8 of the shielding body 7, in the example shown, is beveled in such a way that it forms an acute angle with the air flow. As a result, the air flow can come into effective contact and does not separate. Alternatively, the leading edge 8 may also be of round design. It is likewise not necessary for the shielding body 7 to have a constant thickness; it could also be thicker in the region of the leading edge 8, that is to say it could have the overall cross section of an aircraft wing. It is essential that it permits a non-separating air flow to the inlet opening 3.

The generation of this non-separating flow is additionally intensified by the orientation according to the invention of the shielding body 7 relative to the air mass sensor arrangement 2. A positive pressure is produced by the air mass sensor arrangement 2 in its air intake region, this positive pressure directing the inflowing air together with the wing-shaped shielding body 7 to the inlet opening 3.

The shielding body 7 is connected to the intake manifold 1, preferably in one piece, by means of two front holders 9 and two rear holders 10. The front holders 9 and the rear holders 10 are arranged laterally offset from one another, so that the device can easily be demolded during the production by means of injection molding technology. The rear holders 10 are oriented obliquely toward the center of the intake manifold, so that the air flow is brought together again downstream of the air mass sensor arrangement 2. The trailing edge 11 of the front holders 9 runs obliquely to the air flow direction 6 toward the intake manifold 1 in order to direct water droplets forming there away from the inlet opening 3.

The separating edge 12 of the shielding body 7 is positioned below the inlet opening 3 of the air mass sensor arrangement 2 and preferably downstream of the latter, so that no water particles swirled up at this edge 12 can pass into the inlet opening 3.

In the advantageous design shown in the figures of the device according to the invention, side walls 13, 14 are advantageously integrally formed on the margins of the shielding body 7, these side walls 13, 14 preventing a separation of the air flow at these edges or the ingress of water particle ricochets and thus permitting a narrower shielding body 7 which has a lower flow resistance. The side walls may be provided both on the top side of the shielding body 7 as top side walls 13 and on its underside as bottom side walls 14. They may be integrally formed on the margins of the shielding body 7 over the entire length of the latter, like the top side walls 13, and also only in one section, like the bottom side walls 14.

In the exemplary embodiment shown in the figures, a transverse groove 15 is provided on that side of the air mass sensor arrangement 2 which is subjected to the air flow in the intake manifold 1.

Alternatively, it is equally possible to provide a transversely running web. These measures prevent water particles which strike this side of the air mass sensor arrangement 2 from passing into the inlet opening 3.

What is claimed is:

1. A device, comprising:
   an air intake manifold and an air mass sensor arrangement which is inserted radially therein and whose inlet opening is oriented perpendicularly to an air flow direction in the intake manifold;
   a shielding body being arranged upstream of the inlet opening such that its projection onto the inlet opening covers the inlet opening, wherein
   the shielding body is wing-shaped and ensures a non-separating air flow to the inlet opening, and has an essentially rectilinear surface running transversely to a flow direction of the air flowing over its surface and is oriented perpendicularly to an insertion direction of the air mass sensor arrangement.

2. The device as claimed in claim 1, wherein the shielding body has an arched profile along the flow direction of the air flowing over its surface.

3. The device as claimed in claim 1, wherein margins of the shielding body which run essentially in the flow direction of the air flowing in the intake manifold are provided with side walls which laterally define a top side and/or underside of the shielding body for avoiding marginal swirls.

4. The device as claimed in claim 1, wherein a leading edge of the shielding body, the leading edge being oriented in the flow direction of the air flowing in the intake manifold, is beveled or rounded off, so that the air flow makes effective contact.

5. The device as claimed in claim 4, wherein the edge of the shielding body which is oriented the in flow direction of the air flowing in the intake manifold lies under the inlet opening of the air mass sensor arrangement and downstream of the inlet opening relative to the air flow direction.

6. The device as claimed in claim 1, wherein the shielding body is formed in one piece with the intake manifold.

7. The device as claimed in claim 1, wherein the shielding body has four corners and has holders at the four corners, and front holders and rear holders are arranged laterally offset from one another.

8. The device as claimed in claim 7, wherein the rear holders are arranged obliquely to the air flow direction such that the air flow is directed toward a center of the intake manifold.

9. The device as claimed in claim 7, wherein the front holders, at a trailing edge, run obliquely to the air flow direction toward a wall of the intake manifold.

10. The device as claimed in claim 1, wherein a transversely running web or a transverse groove is provided on the air inflow side of the air mass sensor arrangement, so that water striking the sensor arrangement side cannot run to the inlet opening.

* * * * *